March 3, 1970 W. M. AUSTIN 3,499,104

VIDEO OUTPUT STAGE EMPLOYING STACKED HIGH VOLTAGE AND LOW VOLTAGE TRANSISTORS

Filed June 13, 1966 2 Sheets-Sheet 1

INVENTOR.
WAYNE M. AUSTIN
BY William H. Meagher
Attorney

March 3, 1970 W. M. AUSTIN 3,499,104

VIDEO OUTPUT STAGE EMPLOYING STACKED HIGH VOLTAGE AND LOW VOLTAGE TRANSISTORS

Filed June 13, 1966 2 Sheets-Sheet 2

INVENTOR.
WAYNE M. AUSTIN
BY William H. Meagher
Attorney

United States Patent Office 3,499,104
Patented Mar. 3, 1970

3,499,104
VIDEO OUTPUT STAGE EMPLOYING STACKED HIGH VOLTAGE AND LOW VOLTAGE TRANSISTORS

Wayne Miller Austin, Hanover, N.J., assignor to RCA Corporation, a corporation of Delaware Filed June 13, 1966, Ser. No. 557,283
Int. Cl. H04n 9/18
U.S. Cl. 178—5.4 10 Claims

ABSTRACT OF THE DISCLOSURE

Video output stage comprises a high voltage (high dissipation, high breakdown voltage rating) transistor with its emitter-collector path in series with the emitter-collector path of a low voltage, high gain-bandwidth product rating transistor. The low voltage transistor operates as a common emitter amplifier, driving the emitter of the high voltage transistor, with the base of the latter maintained at a fixed low potential. In color receiver embodiment, matrixing of luminance and color difference signals is achieved in output stage by additionally driving high voltage transistor emitter with a second low voltage transistor in common emitter configuration. Common brightness control, operating via a plurality of such output stages with respective output clamping circuits, involves superposition of adjustable amplitude pulse on common luminance signal input.

Figure 1:
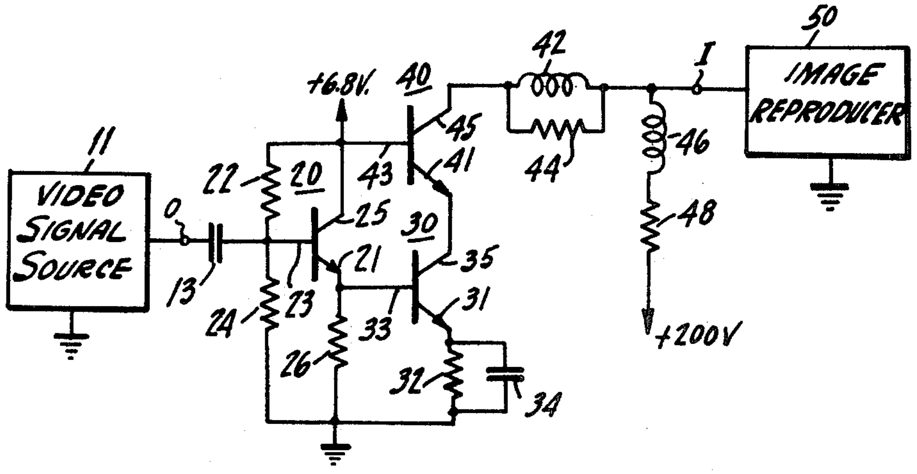

This invention relates generally to video signal processing circuits employing signal translating devices of a semiconductor type, and particularly to semiconductor circuits which may be advantageously employed in satisfying video signal processing requirements of a color television receiver.

The video signal drive requirements of the typical color kinescope pose a difficult problem in designing a color television receiver to employ semiconductor devices, such as transistors, in place of vacuum tubes. A power output stage must be capable of providing a maximum peak-to-peak voltage swing of large magnitude, and, particularly in the case of the luminance component, a wide-band frequency response is additionally required.

A feature of the present invention is an output stage arrangement involving a pair of transistors in a circuit relation effectively permitting division of the stringent performance requirements between the transistors, so that relatively low cost, state-of-the-art devices may be employed. Pursuant to this feature, an output stage may comprise a high voltage, high dissipation, high breakdown voltage rating transistor with its emitter-collector path in series with the emitter-collector path of a low voltage, high gain-bandwidth product rating transistor. The low voltage transistor operates as a common emitter emplifier, driving the emitter of the high-voltage transistor, with the base of latter maintained at a fixed, low potential.

A large amplitude voltage swing is obtainable at the collector of the high voltage transistor. The latter unit assures breakdown protection and provides the required high dissipation capability, but, in view of its circuit role and mode of operation, a high gain-bandwidth product rating is not required of this output unit. Such a rating is demanded only of the base-driven input transistor; however, with the input transistor freed of high breakdown voltage and high dissipation requirements, its gain-bandwidth requirements are readily satisfied by a variety of inexpensive, commercially available transistor types.

Due to the low impedance presented at the emitter of the output transistor, the Miller feedback problem is of minor consequence and a relatively high feedback capacitance ($C_{OB}$) is tolerable in the input transistor. Such tolerance is further enhanced when, per a further feature of the present invention, the base input to the stacked pair is supplied from a low impedance source as constituted by an emitter follower driver stage.

The above-described stacked transistor pair feature of the present invention may be used to advantage in color television receiver video circuitry where the approach to combination of the luminance signal (Y) component with the color difference signals (R–Y, B–Y, G–Y) derived from the chrominance component is via matrixing in the color kinescope itself. In this instance, the stacked pair may serve as the output stage of a luminance channel driving one input electrode structure (e.g., driving, in common, the cathodes of a tri-gun, shadow-mask tube), while the color-difference signals are supplied to appropriate elements of another input electrode structure (e.g., individually supplied to the respective control grids of the tri-gun tube). For the tri-gun tube example, such a drive arrangement would require a minimum of four high voltage transistor units.

However, pursuant to further features of the present invention, a drive arrangement for a tri-gun color kinescope is contemplated wherein only three high voltage transistor units are required. In this arrangement, matrixing of luminance and color difference signals is achieved externally, i.e., the sum signals (R, G and B) are formed prior to signal application to the color kinescope. In each of three channels, a pair of low voltage transistors, operating as common emitter amplifiers are provided, with the base of one driven by luminance signals and the base of the other driven by a color difference signal. The collectors of both drive the emitter of a single high voltage transistor, with the base of the latter at a fixed, low potential. Each of the input transistors is thus in the previously discussed stacked relation with the high voltage transistor, and thereby freed of high breakdown voltage and high dissipation requirements, which are instead satisfied by the output unit. As before, the very low impedance presented at the emitter of the output unit moderates feedback problems for the input units. Moreover, the very low magnitude of the output unit's input impedance in comparison to the output impedance of the input transistors ensures that the desired mixing of color difference and luminance signal components is achieved without any significant attenuation (as might otherwise be experienced if combining in a resistive matrix network).

Pursuant to additional features of the invention, the luminance signal input for the three combiners may be developed from the output of the receiver's video detector through use of a two-stage video amplifier, with an AC coupling, including the requisite luminance delay line, between the stages, and with the second stage connected as an emitter follower to provide a common low impedance luminance signal source for the combiners. D.C. component restoration is conveniently effected at the sum signal output terminals through use of a keyed clamp circuit arrangement. The latter employs a trio of clamping diodes, keyed into conduction and returning the output terminals to a low potential point via the emitter-collector path of a transistor, only during successive horizontal retrace intervals when the transistor is rendered conductive by flyback pulse application.

A unique brightness control arrangement may be associated with the operation of the keyed clamp arrangement, in accordance with an additional feature of the invention. A flyback pulse is applied to the first video amplifier so as to drive it into cutoff during each retrace interval. A D.C. bias adjustment for the first video stage controls the effective amplitude of the introduced pulse, which appears at the sum signal output terminals extending in a diode current enhancing direction. Control of the effective pulse amplitude thus influences the capacitor charge established by the conduction of each clamping diode, thereby affecting the kinescope bias during picture intervals in a manner determining the average brightness level of the displayed picture.

Pusuant to a further feature of the invention, proper set-up of the color kinescope may be facilitated by providing at least two of the combining circuits with luminance drive controls so as to permit highlight color temperature adjustments. In the combiner circuit arrangement heretofore described, variable emitter resistors for two of the luminance input transistors may conveniently serve as the desired drive controls. Use of such drive controls in conjunction with the brightness control arrangement previously described ensures the desired result that a change in brightness control setting will not disturb white balance; i.e., the brightness control change will affect the individual gun biases in a proportioned manner as determined by the drive control settings.

A primary object of the present invention is to provide novel and improved video signal processing circuits employing signal translating devices of a semiconductor type.

A further particular object of the present invention is to provide novel and improved transistor circuit arrangements which may be employed in satisfying video signal processing requirements of a color television receiver.

Figure 2:
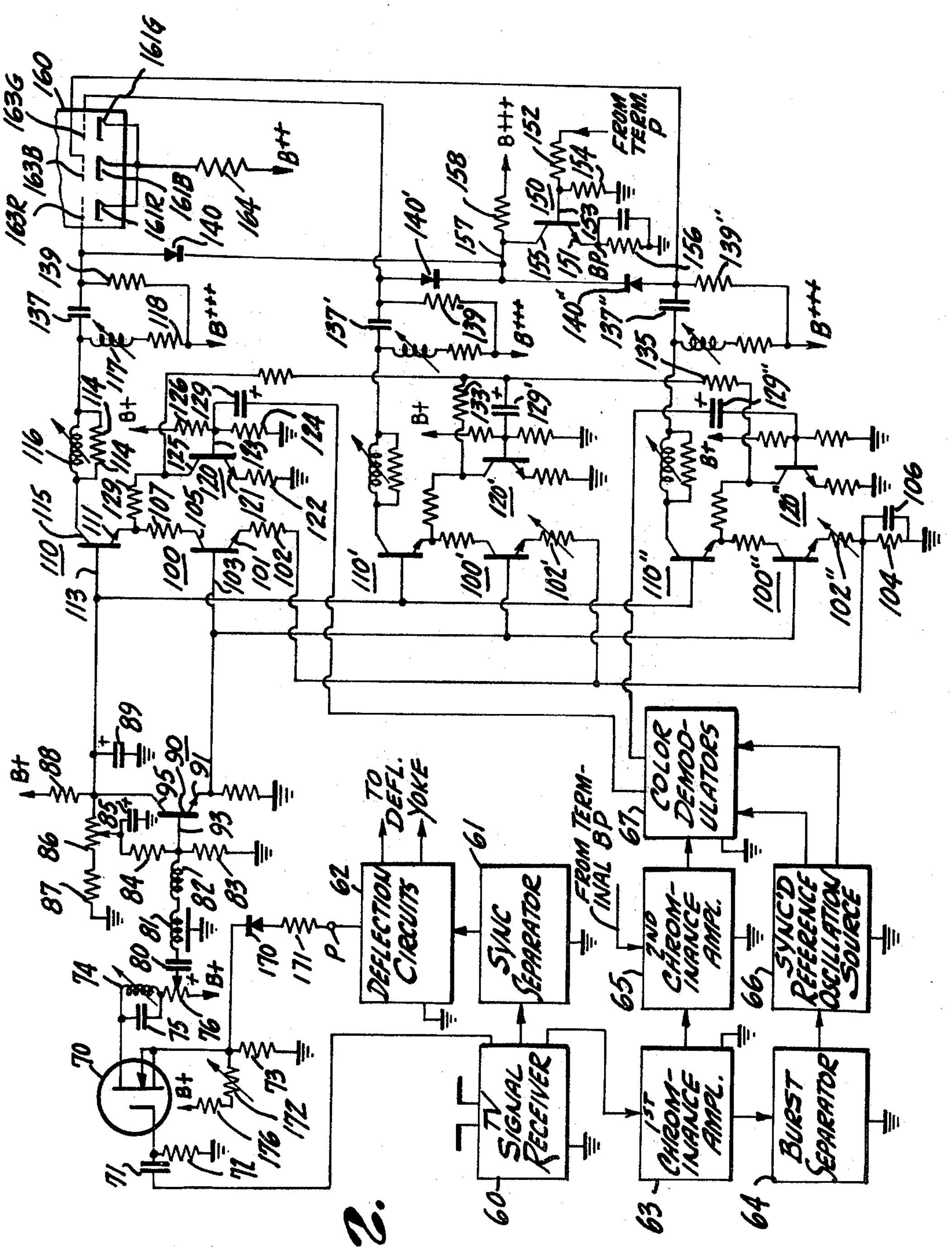

Other objects and advantages of the present invention will be apparent to those skilled in the art upon a reading of the following detailed description and an inspection of the accompanying drawings in which:

FIGURE 1 illustrates, partially in block form, a video signal processing system, which incorporates apparatus, shown in schematic detail, in accordance with an embodiment of the present invention; and FIGURE 2 illustrates a color television receiver, partially in block form, in which transistor circuits for supplying video signals to a color kinescope are shown in schematic detail pursuant to a further embodiment of the present invention.

Referring to FIGURE 1, a video signal source, which may, for example, comprise the video detector of a color television receiver, is represented simply by a block 11, having an output terminal O. Also shown only in block form is an image reproducer 50 having an input terminal I; the reproducer 50 may, for example, comprise a color kinescope. The schematically illustrated apparatus intervening between the source output terminal O and the reproducer input terminal I serves to process the low level, wide-band output of the source in order to develop signals at terminal I meeting the input power, voltage swing and frequency response requirements of the reproducer 50.

The processing circuitry includes a trio of transistors 20, 30 and 40 (illustratively, all of the same NPN conductivity type). Transistor 20 is disposed as an emitter follower (common collector amplifier) responding to signals from source 11 and driving transistor 30, connected as a common emitter amplifier; transistor 30, in turn, drives the output transistor unit 40, which is connected as a common base amplifier.

The base 23 of the emitter follower transistor 20 is coupled to the source output terminal O via a capacitor 13; bias for the base 23 is obtained from a voltage divider, comprising resistors 22 and 24 connected in series between a low B+ supply point and a point of reference potential (e.g., chassis ground), with the base 23 connected to the junction of resistors 22 and 24. The collector 25 of transistor 20 is directly connected to the low B+ supply point, while the emitter 23 is returned to ground via an emitter resistor 26.

Signal drive for transistor 30 is obtained via a direct connection between its base 33 and the emitter 21 of transistor 20. The emitter 31 of transistor 30 is returned to ground via an emitter resistor 32, providing bias stabilization. The emitter resistor 32 is shunted by a capacitor 34; the value of the latter may be chosen to be sufficiently large as to assure bypassing of resistor 32 for signal frequencies to preclude signal degeneration. Alternatively, a smaller value may be chosen where it is desired to provide a degree of negative feedback of signals for bandwidth adjustment purposes.

Output transistor 40 has its emitter 41 directly connected to the collector 35 of transistor 30, and its base 43 maintained at a fixed, low potential by means of a direct connection from the base 43 to the low B+ supply point. The collector 45 of output transistor 40 is connected to a high B+ supply point via the series combination of a series peaking coil 42 (shunted by a damping resistor 44), a shunt peaking coil 46, and a load resistor 48; the junction of coils 44 and 46 is connected to the reproducer input terminal I.

As previously discussed in general terms, the circuit arrangement of FIGURE 1 permits use of relatively low cost, commercially available units for the stacked transistors 30 and 40.

A wide-band, high voltage swing signal output may be supplied to terminal I, without requiring any single transistor to meet both stringent gain-bandwidth product requirements on the one hand and high breakdown voltage, high dissipation requrements on the other hand.

By virtue of the circuit arrangement of the invention, only the output transistor of the unit 40 need possess high breakdown voltage and high dissipation ratings; transistor 30 may comprise a conventionally low voltage transistor. Conversely, high gain-bandwidth product ($f_T$) rating need only be associated with the input transistor 30, with a significant lower gain-bandwidth product rating tolerable for the output transistor 40. Moreover, as previously noted, the low input impedance at the emitter of the output transistor 40 reduces concern over Miller feedback, whereby a relatively high feedback capacitance ($C_{OB}$) is tolerable for the input transistor 30; concern with the feedback capacitance value is further lessened through the use of the emitter follower configuration for driver transistor 20, whereby the base 33 of transistor 30 is driven from a low impedance source.

FIGURE 2 illustrates application of the present invention to a color television receiver, wherein the advantages of the FIGURE 1 embodiment discussed above are augmented. In the showing of FIGURE 2, the initial receiver stages, such as the tuner, IF amplifier and the video detector, are not individually illustrated, but represented only by a block 60 generally designated television signal receiver. Video signal information recovered by the video detector structure of receiver 60 is supplied to three different utilization channels. One output is delivered to a sync separator 61, which separates deflection synchronizing signals from the remainder of the composite video signal; the separated sync output is supplied to deflection circuits 62 for generation of scanning waveforms to be supplied to the receiver's deflection yoke (not illustrated). In the course of generation of horizontal scanning waveform, positive-going flyback voltage pulses are developed during recurring horizontal retrace intervals and appear at a pulse output terminal P. Use of these pulses will be subsequently described.

The other video signal output of receiver 60 is supplied to a first chrominance amplifier 63, which may be of a bandpass character, selectively amplifying the chrominance (and burst synchronizing) component of the composite video signal. An output of amplifier 63 is supplied to a second chrominance amplifier 65 providing further selectivity and gain for the chrominance component. Amplifier 65 provides a chrominance component input for the color demodulators 67, which serve to synchronously detect the modulated color subcarrier waves at a pair of selected phase points, as determined by the phasing of a pair of outputs of a synchronized reference oscillation source 66. To establish proper phase synchronization of the source 66, a burst separator 64, per use of suitable gating techniques, selects the burst synchronizing component from an output of an amplifier 63 for application to a synchronizing input terminal of source 66. The outputs of color demodulators 67 comprise a pair of different color difference signals, illustratively R–Y and B–Y, which are processed in a manner to be subsequently described.

Another video signal output of receiver apparatus 60 is supplied to a wideband luminance channel, which has been illustrated in schematic detail. A field effect transistor 70 of the MOS type serves as a first video amplifier stage; its output is supplied, via an AC coupling path inclusive of the usual luminance delay line 81, to the input of a transistor 90 disposed as emitter follower. It will be recognized that this transistor functions in the FIGURE 2 arrangement in a manner analogous to the transistor 20 of the FIGURE 1 arrangement. Likewise, transistor 100 and 110 are in circuit relationships comparable to those of transistors 30 and 40 of FIGURE 1. The output of transistor 110 is supplied via a capacitor 137 to a control grid 163R of a tri-gun color kinescope 160. Associated with the capacitor 137 is a keyed clamp circuit arrangement incorporating a clamping diode 140, controlled by a keyed transistor 150.

An element having no counterpart in the FIGURE 1 arrangement is the color difference amplifier stage utilizing transistor 120; this stage supplies an additional input to the output transistor 110, but in a manner analogous to the driving of transistor 110 by the luminance input transistor 100. It may be readily appreciated that the arrangement of FIGURE 2 thus involves the additional function of matrixing the luminance and color difference signals.

It will be further seen that the matrixing/output amplifier array of transistors 100, 110 and 120 is but one of three generally similar arrays; a second array utilizing transistors 100′, 110′ and 120′ supplies signals to a second control grid 163G of the color kinescope 160, while a third array, incorporating transistors 100″, 110″ and 120″, supplies signals to a third kinescope control grid 163B.

To appreciate the particular operations of the FIGURE 2 arrangement, the circuit details will now be considered, with particular attention to the array for driving control grid 163R (as representative of the other, generally similar arrays). The video output of receiver 60 is applied via capacitor 71 to the gate electrode of MOS transistor 70; a DC return to ground for the gate electrode is provided by resistor 72. The source electrode of transistor 70 is connected to ground via a source resistor 73. Additional apparatus is associated with the source electrode for brightness control purposes, and will be described subsequently. The drain electrode of transistor 70 is connected via a peaking coil 74 (shunted by a tuning capacitor 75) and a potentiometer 76 to a low operating potential supply point (designated B+).

The adjustable tap of potentiometer 76 (which serves as a contrast control) is coupled via a blocking capacitor 80 in series with the luminance delay line 81 and a peaking coil 82 to the base 93 of the emitter follower transistor 90. D.C. bias of the base 92 is obtained by connection of the base to the junction of a pair of resistors 83 and 84 which are connected in series between chassis ground and an adjustable bias supply, constituted by an adjustable voltage divider incorporating resistive elements 86, 87 and 88, and associated filter capacitors 85 and 89. Adjustment of the tap of potentiometer 86 permits selection of the operating point of transistor 90 (as well as subsequent stages DC coupled thereto). The collector 95 of transistor 90 is held at a fixed low unidirectional potential, by virtue of its connection to the junction of resistor 88 and filter capacitor 89, which provide a decoupling effect. The emitter 91 of transistor 90 is returned to ground via the emitter resistor 92.

The base 103 of transistor 100 is directly connected to the emitter 91 of transistor 90. The emitter 101 is connected to ground via the emitter feedback resistor 102 (unbypassed) in series with an additional emitter resistor 104, the latter bypassed by capacitor 106. The collector 105 of transistor 100 is connected via resistor 107 to the emitter 111 of the output transistor 110.

The base 113 of output transistor 110 is maintained at the same low, fixed potential as the emitter-follower collector electrode 95 by virtue of a direct connection thereto. The collector 115 of output transistor 110 is connected to a source of high operating potential (designated B++++) by means of the series combination of series peaking coil 116 (shunted by damping resistor 114), shunt peaking coil 117 and load resistor 118. The capacitor 137 couples the junction of coils 116 and 117 to the kinescope control grid 163R.

It should be recognized that by virtue of the connections heretofore described, luminance component application to grid 163R is achieved in a manner obtaining all the advantages disclosed in connection with the FIGURE 1 embodiment. Thus, transistor 110 may comprise the high voltage, high dissipation unit, while transistor 100 comprises the low voltage, high gain-bandwidth product rating transistor. However, additionally, the general principles relied upon in obtaining these advantages also come into play in the handling of color difference signals. For this purpose, an output of the color demodulator 67 (illustratively the R–Y signal) is applied via a blocking capacitor 129 to the base 123 of an additional low voltage transistor 120. Bias for the base 123 is obtained from an intermediate point on a B+ voltage divider provided by the series combination of resistors 124 and 126. The emitter 121 of transistor 120 is returned to ground via an emitter resistor 122, serving bias stabilization and bandwidth adjusting purposes. The collector 125 of transistor 120 is connected via a resistor 129 to the emitter 111 of output transistor 110.

The color difference amplifier 120 is freed from the high breakdown voltage, high dissipation requirements by the manner of driving output transistor 110, as was transistor 100. The low input impedance at emitter 111 also moderates the feedback capacitance problems for transistor 120. Moreover, since the input impedance at the emitter 111 is very low compared with the output impedances of both of the transistors 100 and 120, the desired mixing of luminance and color difference signals is facilitated, there being no significant signal attenuation in the matrixing operation.

A comparable matrixing operating takes place for the other output of the demodulator structure 67 (illustratively, the B–Y signal) in the array of transistors 100″, 110″ and 120″. The B–Y coupling is effected via the blocking capacitor 129″.

The third array of transistors 100′, 110′ and 120′ also performs a comparable matrixing of brightness and color difference signals, but its color difference signal input (illustratively, the G–Y signal) is not derived from the demodulator 67, but rather from a suitably proportioned combination of the outputs of amplifiers 120 and 120″. This matrixing of color difference signals to obtain an additional color difference signal is achieved by a resistive matrixing network incorporating the respective matrixing resistors 131, 133 and 135. The matrix output is developed at a common junction point of these three resistors, with resistor 131 connected to the junction point from the collector of transistor 120, resistor 133 from the collector of transistor 120′ and resistor 135 from the collector of transistor 120″. The matrix output point is coupled via blocking capacitor 129′ to the base input of transistor 120′.

As previously noted in connection with the output of transistor 110, a keyed clamp circuit is empolyed for D.C.

restoration purposes; such D.C. restoration is also employed in connection with the outputs of transistors 110′ and 110″. Choosing the transistor 110 output clamping as representative for description purposes, the use of coupling capacitor 137 in the signal path from collector 115 to kinescope grid 163R is again noted. A resistor 139 is connected between grid 163R and the B+++ supply point. Diode 140 has its anode connected to grid 163R, and its cathode connected to the collector 155 of the keyed transistor 150.

The keying pulse input to transistor 150 is obtained from an intermediate point of a pulse voltage divider formed by resistors 152 and 154, connected in series between the positive flyback pulse terminal P and ground. An emitter resistor 156, shunted by capacitor 157, is connected between emitter 151 and ground, and provides a low impedance pulse load for supplying burst blanking pulses (via terminal BP) to the chrominance amplifier 65. The collector 155 of transistor 150 is connected to the B+++ supply point by means of resistor 158.

In operation, transistor 150 conducts only when keyed on during each horizontal retrace interval. Its conduction allows diode 140 to conduct, clamping grid 163R to a low potential slightly above ground potential. Due to the diode conduction, a charge is developed on capacitor 137, the extent of charge development being determined by the most positive-extending portion of the signal output of transistor 110. This charge is held throughout the succeeding line interval, thereby re-establishing the signal's D.C. component.

The brightness control apparatus of the FIGURE 2 arrangement, not heretofore described, takes advantage of the above-described clamping operation. For brightness control purposes, a positive flyback pulse is applied from terminal P, via a resistor 171 in series with diode 170 to the source electrode of the MOS transistor 70. This pulse drives transistor 70 to cut-off, thus effectively injecting a positive-going pulse during each retrace interval; this pulse will be the most positive going signal portion at the collector of transistor 110, and its relative amplitude will thus influence the charge development on capacitor 137.

A variable resistor 172 in series with a fixed resistor 176 is connected between the B+ supply point and the source electrode of transistor 70. Variable resistor 172 provides a control of the gate-source bias for transistor 70, and may thus be seen to provide a control of the effective amplitude of the injected pulse. By varying this effective pulse amplitude, the line interval bias developed by charging of capacitor 137 (and the analogous capacitors 137′ and 137″) for the kinescope grids is controlled, and the average brightness of the displayed picture thereby-determined.

Luminance drive adjustment controls for two of the color signal channels are constituted by the variable emitter resistors 102′ and 102″ of the respective luminance input transistors 100′ and 100″. These control luminance signal degeneration in the respective channels and thus provide a facility for establishing proper highlight color temperature. The nature of the brightness control arrangement, using effective amplitude control of an injected pulse in the initial video amplifier stage, results in brightness adjustments not disturbing white balance. This is because the injected pulse, as it appears at the respective output transistor collectors, is subject to the same proportioning by the drive controls as the remainder of the signal.

Component values suitable for use in the circuit of FIGURE 2 are set forth below.

| | |
|---|---|
| R72—470K ohms | R86—5K ohms |
| R73—150 ohms | R87—2.2K ohms |
| R76—2.5K ohms | R88—1.8K ohms |
| R83—3K ohms | R92—470 ohms |
| R84—4.7K ohms | R102—33 ohms |

| | |
|---|---|
| R102′—50 ohms | R158—15K ohms |
| R102″—50 ohms | R164—1000 ohms |
| R104—10 ohms | R171—1.5K ohms |
| R107—10 ohms | R172—1.8K ohms |
| R114—5.6K ohms | R176—1K ohms |
| R118—3.9K ohms | C71—0.1 μf. |
| R122—56 ohms | C75—.8–8 pf. |
| R124—2.7K ohms | C80—20 μf. |
| R126—18K ohms | C85—20 μf. |
| R129—100 ohms | C89—20 μf. |
| R131—390 ohms | C106—.01 μf. |
| R133—560 ohms | C129—20 μf. |
| R135—1000 ohms | C129′—20 μf. |
| R139—680K ohms | C129″—20 μf. |
| R139′—680K ohms | C137—.0082 μf. |
| R139″—680K ohms | C137′—.0082 μf. |
| R152—2.2K ohms | C137″—.0082 μf. |
| R154—2.2K ohms | C157—820 pf. |
| R156—390 ohms | |

What is claimed is:

1. In a wide-band video signal translating system including a source of video signals and a video signal utilization device requiring a maximum video signal input voltage swing of a given magnitude, video signal amplifying apparatus comprising, in combination:

a first and a second transistor of the same conductivity type, each having base, emitter and collector electrodes, said first transistor having a breakdown voltage rating of a magnitude appreciably smaller than said given magnitude of required voltage swing, said second transistor having a breakdown voltage rating of a magnitude exceeding said given magnitude of required voltage swing, and said first transistor having a high gain-handwidth product rating relative to the gain-bandwidth product rating of said second transistor;

a source of unidirectional potential of a magnitude exceeding said given magnitude of required voltage;

a load impedance;

means, including a first direct current conductive coupling between the collector of said first transistor and the emitter of said second transistor and a second direct current conductive coupling between the collector of said second transistor and said load impedance, for coupling said load impedance, the emitter-collector path of said second transistor and the emitter-collector path of said first transistor in series across said unidirectional potential source;

means for applying signals from said video signal source to the base of said first transistor;

means for maintaining the base of said second transistor at a relatively fixed potential;

and means for applying signals developed across said load impedance to said video signal utilization device.

2. Apparatus in accordance with claim 1 wherein said first-named signal applying means comprises a third transistor disposed as an emitter follower, and means for coupling the emitter of said third transistor to the base of said first transistor.

3. In a color television receiver including a luminance signal source, a color difference signal source, and a color kinescope having an input electrode, a color signal channel comprising:

a high voltage transistor having base, emitter and collector electrodes;

a pair of low voltage transistors, each having base, emitter and collector electrodes;

means for applying signals from said luminance signal source to the base of one of said pair of low voltage transistors;

means for applying signals from said color difference signal source to the base of the other of said pair of low voltage transistors;

means for providing respective direct current conductive connections between the collectors of said pair of low voltage transistors and the emitter of said high voltage transistor;

means for maintaining the base of said high voltage transistor at a relatively low unidirectional potential;

means for applying a relatively high unidirectional operating potential to said collector of said high voltage transistor;

and means for applying signals appearing at the collector of said high voltage transistor to said input electrode of said color kinescope.

4. Apparatus in accordance with claim 3, wherein said receiver additionally includes second and third color difference signal sources, and wherein said color kinescope additionally includes second and third input electrodes, said apparatus also including:

a second color signal channel comprising a combination of elements corresponding to those of the first-named color signal channel for coupling said luminance signal source and said second color difference signal source to said second input electrode;

a third color signal channel comprising a combination of elements corresponding to those of the first-named signal channel for coupling said luminance signal source and said third color difference signal source to said third input electrode;

each of said second and third color signal channels including respective means for controlling the magnitude of the luminance signal drive of the respective channel's high voltage transistor, each of said controlling means comprising a variable impedance in the emitter circuit of the luminance-driven low voltage transistor.

5. Apparatus in accordance with claim 3 wherein said last-named signal applying means includes (1) a capacitor coupled between the collector of said high voltage transistor and said color kinescope input electrode; and (2) D.C. restoration means comprising a periodically conducting device connected between said color kinescope input electrode and a point of signal reference;

and wherein said luminance signal source includes:

(3) a video amplifier device having a control electrode and an output electrode;

(4) pulse injecting means coupled to said control electrode of said video amplifier device for periodically cutting off said video amplifier device, the timing of the pulses corresponding with the periods of conduction of said periodically conducting device, and the polarity of the pulses being such that they appear at said color kinescope input electrode extending in a direction tending to enhance conduction of said periodically conducting device; and (5) means for applying an adjustable unidirectional potential to said video amplifier device to control the effective amplitude of the injected pulses;

and wherein said luminance signal applying means comprises means for providing an exclusively A.C. signal coupling between the output electrode of said video amplifier device and the base of said one low voltage transistor.

6. In a television receiver the combination comprising:

a first video amplifier device having a control electrode and an output electrode;

an output video amplifier device having input and output electrodes;

means providing an AC signal coupling between said output electrode of said first device and an input electrode of said output device;

a video signal utilization device having an input terminal;

a capacitor coupled between an output electrode of said output device and said input terminal;

D.C. restoration means comprising a periodically conducting device connected between said input terminal and a point of signal reference potential;

means coupled to said control electrode of said first device for effectively injecting pulses in the signal translated by said devices, the timing of the pulses corresponding with the periods of conduction of said periodically conducting device, and the polarity of the pulses being such that they appear at said input terminal extending in a direction tending to enhance conduction of said periodically conducting device;

and means for applying an adjustable unidirectional potential to said control electrode.

7. In a color television receiver including a luminance signal source, a trio of color difference signal sources, and a color kinescope having a trio of input electrodes, a trio of color signal channels each comprising:

a high voltage transistor having base, emitter and collector electrodes;

a pair of low voltage transistors, each having base, emitter and collector electrodes;

means for applying signals from said luminance signal source to the base of one of said pair of low voltage transistors;

means for applying signals from a respective one of said trio of color difference signal sources to the base of the other of said pair of low voltage transistors;

means for providing respective direct current conductive connections between the collectors of said pair of low voltage transistors and the emitter of said high voltage transistor;

means for maintaining the base of said high voltage transistor at a relatively low unidirectional potential;

means for applying a relatively high unidirectional operating potential to said collector of said high voltage transistor;

and means for applying signals appearing at the collector of said high voltage transistor to a respective one of said trio of electrodes of said color kinescope.

8. In a color television receiver including a luminance signal source, a color difference signal source and a color kinescope having an input electrode requiring a maximum color signal input voltage swing of a given magnitude, the combination comprising:

a first and a second transistor of the same conductivity type, each having base, emitter and collector electrodes, said first transistor having a breakdown voltage rating of a magnitude appreciably smaller than said given magnitude of required voltage swing, said second transistor having a breakdown voltage rating of a magnitude exceeding said given magnitude of required voltage swing, and said first transistor having a high gain-bandwidth product rating relative to the gain-bandwidth product rating of said second transistor;

a source of unidirectional potential of a magnitude exceeding said given magnitude of required voltage;

a load impedance;

means, including a first direct current conductive coupling between the collector of said first transistor and the emitter of said second transistor and a second direct current conductive coupling between the collector of said second transistor and said load impedance, for coupling said load impedance, the emitter-collector path of said second transistor and the emitter-collector path of said first transistor in series across said unidirectional potential source;

means for applying signals from one of said signal sources to the base of said first transistor;

means for maintaining the base of said second transistor at a relatively fixed potential;

and means for applying signals developed across said load impedance to said color kinescope input electrode.

9. In a color television receiver including a luminance signal source, a color difference signal source and a color kinescope having an input electrode requiring a maximum color signal input voltage swing of a given magnitude, the combination comprising:

a first, a second and a third transistor of the same conductivity type, each having base, emitter and collector electrodes, each of said first and second transistors having a breakdown voltage rating of a magnitude appreciably smaller than said given magnitude of required voltage swing, said third transistor having a breakdown voltage rating of a magnitude exceeding said given magnitude of required voltage swing, and each of said first and second transistors having a high gain-bandwidth product rating relative to the gain-bandwidth product rating of said third transistor;

a source of unidirectional potential of a magnitude exceeding said given magnitude of required voltage;

a load impedance;

means, including a first direct current conductive coupling between the collector of said first transistor and the emitter of said third transistor and a second direct current conductive coupling between the collector of said third transistor and said load, for coupling said load impedance, the emitter-collector path of said third transistor and the emitter-collector path of said first transistor in series across said unidirectional potential source;

means, including a coupling between the collector of said second transistor and the emitter of said third transistor, for effectively shunting the emitter-collector path of said second transistor across the emitter-collector path of said first transistor;

means for applying signals from one of said signal sources to the base of said first transistor;

means for applying signals from the other of said signal sources to the base of said second transistor;

means for maintaining the base of said third transistor at a relatively fixed potential;

and means for applying signals developed across said load impedance to said color kinescope input electrode.

10. In a color television receiver including a luminance signal source, a color difference signal source, and a color kinescope having an input electrode requiring a maximum color signal input voltage swing of a given magnitude, a color signal channel comprising:

a high voltage transistor having base, emitter and collector electrodes and having a breakdown voltage rating exceeding said given magnitude;

a pair of low voltage transistors, each having base, emitter and collector electrodes, and each having a gain-bandwidth product rating significantly exceeding the gain-bandwidth product rating of said high voltage transistor;

means for applying signals from said luminance signal source to the base of one of said pair of low voltage transistors;

means for applying signals from said color difference signal source to the base of the other of said pair of low voltage transistors;

means for providing respective signal coupling paths between the collectors of said pair of low voltage transistors and the emitter of said high voltage transistor, at least one of said signal coupling paths being direct current conductive;

means for maintaining the base of said high voltage transistor at a relatively low unidirectional potential;

means for applying a unidirectional operating potential to said collector of said high voltage transistor, which operating potential exceeds in magnitude the breakdown voltage ratings of each of said pair of low voltage transistors but less than the breakdown voltage rating of said high voltage transistor;

and means for applying signals appearing at the collector of said high voltage transistor to said input electrode of said color kinescope.

References Cited

UNITED STATES PATENTS

| | | | |
|---|---|---|---|
| 2,819,334 | 1/1958 | Squires | 178—5.4 |
| 2,926,307 | 2/1960 | Ehret | 330—18 |
| 2,927,957 | 3/1960 | Torre | 178—5.4 |
| 2,981,895 | 4/1961 | Koch | 330—18 |
| 3,070,656 | 12/1962 | Wiencek | 178—7.5 |
| 3,091,659 | 5/1963 | Massman. | |
| 3,321,574 | 5/1967 | Krause | 178—5.4 |
| 3,370,242 | 2/1968 | Offner | 330—18 |

ROBERT L. GRIFFIN, Primary Examiner

R. P. LANGE, Assistant Examiner

U.S. Cl. X.R.

178—73; 330—17